US006292674B1

(12) United States Patent
Davis

(10) Patent No.: US 6,292,674 B1
(45) Date of Patent: Sep. 18, 2001

(54) ONE-HANDED CONTROL FOR WIRELESS TELEPHONE

(75) Inventor: Gerald C. Davis, Hillsborough, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/135,315

(22) Filed: Aug. 5, 1998

(51) Int. Cl.$^7$ .................................................. H04B 1/38
(52) U.S. Cl. ........................ 455/550; 455/90; 455/575
(58) Field of Search ........................... 455/90, 575, 569, 455/550; 379/433, 430, 428; 236/51; 89/1.11

(56) References Cited

U.S. PATENT DOCUMENTS

| | | | | |
|---|---|---|---|---|
| 4,930,392 | * | 6/1990 | Wilson ................................. | 89/4.11 |
| 5,006,836 | | 4/1991 | Cooper ................................ | 340/710 |
| 5,112,785 | | 5/1992 | Cooper ................................ | 240/710 |
| 5,329,577 | * | 7/1994 | Norimatsu .......................... | 455/550 |
| 5,493,690 | * | 2/1996 | Shimazaki .......................... | 455/575 |
| 5,504,813 | | 4/1996 | Takasaki . | |
| 5,538,181 | * | 7/1996 | Simmons et al. .................. | 236/51 |
| 5,579,443 | * | 11/1996 | Tatematsu et al. ................. | 455/521 |
| 5,588,041 | * | 12/1996 | Meyer, Jr. et al. ................. | 455/569 |
| 5,696,821 | * | 12/1997 | Urbansi .............................. | 455/570 |
| 5,758,267 | * | 5/1998 | Pinder et al. ....................... | 455/90 |
| 5,802,476 | * | 9/1998 | Nakajima et al. .................. | 455/550 |
| 5,924,046 | * | 7/1999 | Martensson ........................ | 455/567 |
| 6,026,283 | * | 2/2000 | Stephenson ........................ | 455/575 |
| 6,032,058 | * | 2/2000 | Higuchi et al. .................... | 455/550 |
| 6,055,439 | * | 4/2000 | Helin et al. ........................ | 455/550 |

FOREIGN PATENT DOCUMENTS

| | | |
|---|---|---|
| 0346859 | 12/1989 | (EP) . |
| 2316574 | 2/1998 | (GB) . |
| WO 9716932 | 5/1997 | (WO) . |

OTHER PUBLICATIONS

*Patent Abstracts of Japan*, vol. 1996, No. 09, published Sep. 30, 1996.
*Patent Abstracts of Japan*, vol. 011, No. 171, published Jun. 2, 1987.

* cited by examiner

*Primary Examiner*—Vivian Chang
*Assistant Examiner*—Charles N. Appiah
(74) *Attorney, Agent, or Firm*—Wood, Phillips, VanSanten, Clark & Mortimer

(57) ABSTRACT

A control apparatus for a hand-held wireless telephone having a housing and operating in a first operational state of a plurality of sequential operational states. The control apparatus changes the operational state of the wireless telephone from the first operational state to a second operational state. The control apparatus itself comprises a detector that produces a signal responsive to a user grasping the housing of the wireless telephone and a controller responsive to receiving the signal produced by the detector and configured to select another operational state following the first operational state in a predetermined sequence of operational states.

20 Claims, 7 Drawing Sheets

ONE-HANDED CONTROL FOR WIRELESS TELEPHONE

FIELD OF THE INVENTION

This invention relates to the field of wireless telephones, and, more specifically, to operational controls for wireless telephones.

BACKGROUND OF THE INVENTION

It is common knowledge that wireless telephones (also called mobile stations, cellular telephone and cell phones) do not operate in the same manner as conventional wireline telephones. Most wireline telephone operations, such as answering the telephone and disconnecting the telephone, can both be accomplished with one hand. In contrast, a wireless telephone usually requires two hands to operate. To answer or disconnect a wireless telephone, the user must hold the telephone in one hand and push a "send" or "end" button, respectively. Hunting for a specific button and then pushing it can be awkward, especially in comparison to wireline telephones. Answering a wireless call can be dangerous in an automobile if the driver must take his or her eyes off of the road to hunt for the "send" button. Some people try to use the thumb of the hand in which they are holding the wireless telephone to push buttons. The thumb is not the best pointing device, however, and many wireless telephones are too big for this maneuver. Further, as telephones become smaller while simultaneously performing more functions, the buttons are becoming smaller and harder to read and touch individually.

This problem is partially addressed by wireless telephones that have "flips" or panels that rotate out. Some of these flip phones answer a call when the flip is opened (and some disconnect when the flip is closed). However, many of the flip phones require two hands to open, and other functions cannot be accessed by use of the flip. The user must still use two hands to perform these functions. Therefore, there is a need in the art for wireless telephones that can be operated in as simple a manner as a wireline telephone.

SUMMARY OF THE INVENTION

In accordance with one aspect of this invention, a control apparatus for a hand-held wireless telephone is provided. The wireless telephone has a housing and operates in a first operational state comprising one of a plurality of sequential operational states. The control apparatus changes the operational state of the wireless telephone from the first operational state to a second operational state. The control apparatus itself comprises a grasp detector that produces a signal responsive to a user grasping the housing of the wireless telephone and a controller configured to select a next sequential operational state following the first operational state as the second operational state responsive to receiving the signal produced by the detector.

In accordance with another aspect of this invention, the detector comprises a thermal sensor embedded in the wireless telephone's housing and generates the signal responsive to a rise in temperature around the housing, and, advantageously, generates the signal responsive to a decrease in temperature. According to a further aspect of this invention, the housing has at least one flexible side, wherein the grasp detector may be a pressure sensitive switch under the flexible side that generates the signal when the user squeezes the flexible side.

According to another aspect of this invention, the housing has a first and a second flexible location, wherein the detector further comprises a first pressure sensitive switch under the first flexible location and a second pressure sensitive switch under the second flexible location. The detector may generate the signal when the user squeezes either the first or the second location. In accordance with yet another aspect of this invention, the housing has a first and a second flexible side, and the detector comprises a first pressure sensitive switch under the first flexible side and a second pressure sensitive switch under the second flexible side. The detector generates a first signal when the user squeezes the first flexible side, and generates a second signal when the user squeezes the second flexible side. According to this aspect of the invention, in response to the first signal, the controller is configured to select a second operational state following a first operational state in a predetermined sequence of a plurality of operational states; and, in response to the second signal, is configured to select another operational state in the sequence. Usually, but not always, the "another" operational state will be a subsequent operational state following the second operational state in the sequence.

In accordance with another aspect of this invention, the housing includes a motion sensor, and the detector generates the signal when the housing is moved by the user. According to a further aspect of this invention, the detector further includes a timer, and wherein the detector generates the signal when the housing is stationary for a predetermined time. According to yet a further aspect of this invention, the wireless telephone includes an OR gate receiving input from a microphone, a speaker, and the motion sensor. The detector is connected to the OR gate such that the detector does not sends the signal to the controller when there is input from the microphone, speaker or motion detector for the predetermined period of time. According to a further aspect of this invention, the detector comprises a capacitance sensor enclosed in the housing, wherein the capacitance sensor generates the signal responsive to the user's grasp completing a circuit through the capacitance sensor, and generates the signal responsive to the user letting go of the housing.

According to another aspect of this invention, the housing includes a light sensitive element, wherein the light sensitive element generates a signal when the user's hand blocks the light sensor from the ambient light and generates a signal when the user's hand moves away from and uncovers the sensor.

According to an aspect of this invention, when the wireless telephone is operating in an "alerting" state, the controller is configured to change the alerting state to a "send" ("off hook") state responsive to the signal from the detector. According to another aspect of this invention, when the wireless telephone is operating in a "send" state, the controller is configured to change the "send" state to a "standby" ("on hook") state responsive to the signal from the detector.

According to a further aspect of this invention, when the wireless telephone is operating in a "standby" state, the controller is configured to change the "standby" state to a "redial" state responsive to the signal from the detector. In accordance with still yet another aspect of this invention, when the wireless telephone is operating in a "function" state, the controller is configured to change the "function" state" to a "standby" state responsive to the signal from the detector. In accordance with another aspect of this invention, when the wireless telephone is operating in a "function" state, the controller is configured to change to a positive state responsive to a first signal and a negative state responsive to a second signal.

According to an aspect of this invention, a wireless telephone is provided that operates in a wireless telephone network that sends an alerting signal to alert the wireless telephone of an incoming call and communicates with the wireless telephone by a full duplex radio connection. The wireless telephone includes a control for changing a state from a "standby" state to an "active" state responsive to the alerting signal and being picked up by the user.

A method for operating a wireless telephone to answer an incoming call from a wireless network in according with a further aspect of this invention operates in a system wherein the wireless telephone and the wireless network communicate by a full duplex radio connection, and the wireless network sends an incoming call alert signal to the wireless telephone prior to establishing the full duplex connection. The method comprises receiving an incoming call alert, detecting a user grasping the wireless telephone and the wireless telephone establishing a full duplex connection with the wireless network responsive to the call alert and the detected grasp.

A further method for operating a wireless telephone to disconnect a call between the wireless telephone and a wireless network according to a further aspect of this invention operates in a system wherein the wireless telephone and wireless network communicate by a full duplex radio connection. The method according to this aspect of the invention comprises establishing a full duplex connection between the wireless telephone and the wireless network, detecting a user grasping the wireless telephone, and disconnecting the full duplex connection with the wireless network responsive to the detected grasp.

BRIEF DESCRIPTION OF THE DRAWINGS

A more complete understanding of this invention may be obtained from a consideration of the following detailed description in conjunction with the drawings, in which.

DETAILED DESCRIPTION

Because most people are used to the wireline telephone paradigm of picking up the receiver to answer the telephone and of putting down the telephone to hang up, the present invention discloses a variety of switches that can change the state of a wireless telephone by squeezing it, picking it up, covering a photocell, etc., generically referred to herein as "grasping" the telephone. Further, the user can put the wireless telephone down and it changes state ("hangs up"). This unique configuration of a wireless telephone makes operating it, especially answering and hanging up, as simple as a wireline telephone.

Figure 1:
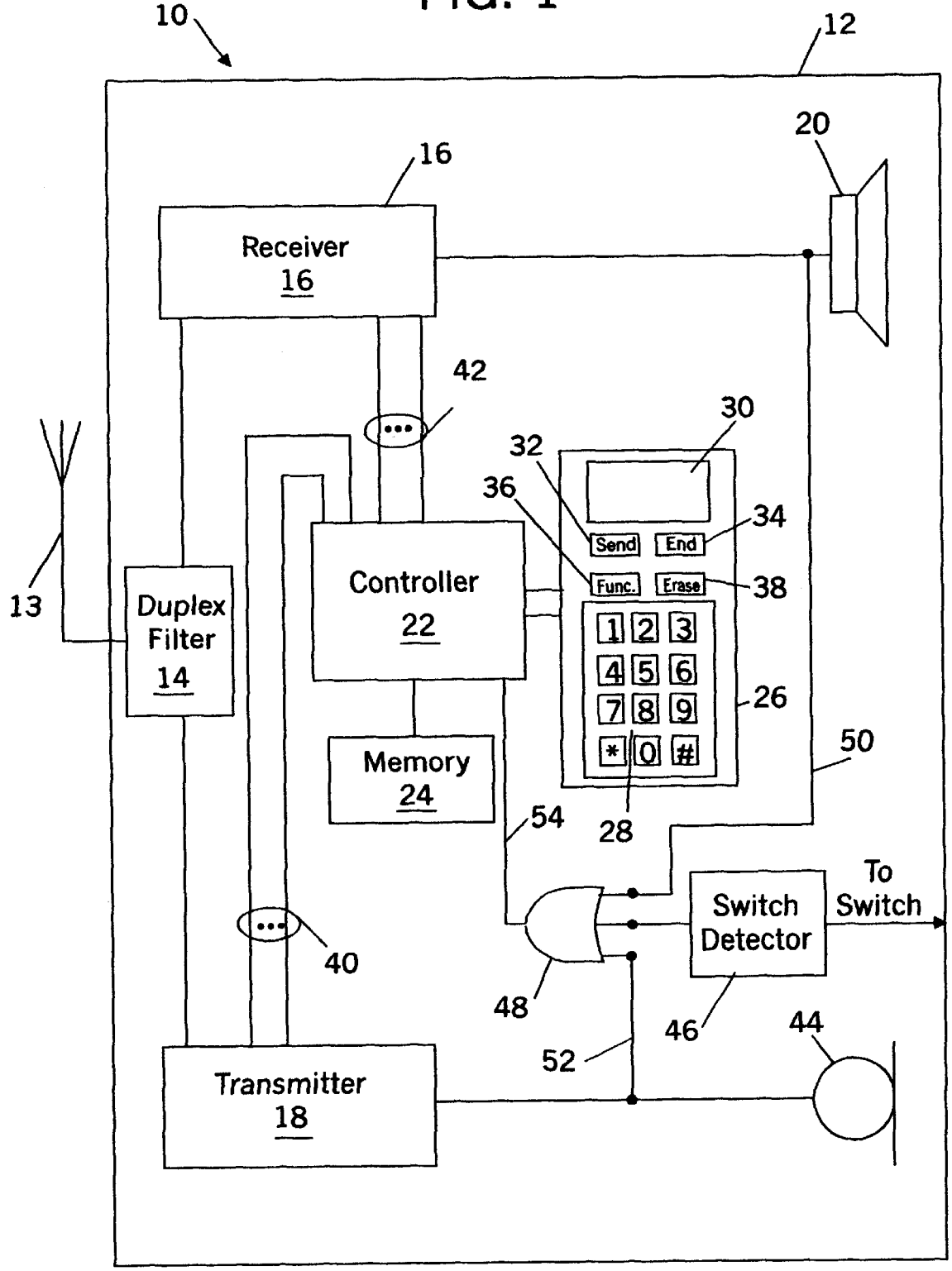
FIG. 1 is a block diagram of a wireless telephone that is responsive to a user's grasp according to an exemplary embodiment of this invention.

Turning to FIG. 1, a block diagram of an exemplary embodiment of a wireless telephone made according to the invention is shown generally at 10. The wireless telephone 10 includes a housing 12 supporting an antenna 13 on its exterior for sending and receiving radio signals between itself and a wireless network. The antenna 13 is connected to a duplex filter 14, which enables a receiver 16 and a transmitter 18 to receive and broadcast (respectively) on the same antenna 13. The receiver 16 demodulates, demultiplexes and decodes the radio signals into one or more channels. Such channels include a control channel and a traffic channel. Speech on the traffic channel is delivered to a speaker 20 (or data on the traffic channel is delivered to another output device, such as a fax or modem connector).

The receiver 16 delivers messages from the control channel to a controller 22. The controller 22 controls and coordinates the functioning of the wireless telephone 10 in respect to a wireless network responsive to the control messages using programs and data stored in a memory 24. The controller 22 operates in a plurality of sequentially ordered states, in order to keep the required controls to a minimum. Such operational states include, but are not limited to, active (on a call), standby, function (menu), yes and no (for use with the function key), alert (incoming call), dialing and redialing.

The controller 22 controls the operation of the wireless station 10 responsive to input from a user interface 26. The user interface 26 includes a keypad 28 as a user-input device and a display 30 to give the user information. Special purpose buttons SEND 32, END 34, FUNCTION (sometimes called "MENU") 36 and ERASE 38 are typical multifunction buttons that change the operational state of the controller 22 of the wireless telephone 10 as known in the art and are found on most wireless telephones. According to the prior art, the SEND button 32 is pressed when wireless telephone is in an alert state ("ringing" in wireline terminology) to cause the controller 22 to complete a full duplex radio connection in the active state. Further, the SEND button 32 is pressed in the dialing state after a destination directory number is entered to change to the active state to establish a full duplex radio connection and connect to the destination telephone. The SEND button 32 is used in some wireless telephones, when the controller 22 is in the standby state, to cause the last directory number dialed to be redialed. It is also used in menu functions to mean "YES".

The END button 34 is generally used when the controller 22 is in the active (on a call) state, to disconnect the call (hang up the phone), and is used in menu functions to mean "NO". The FUNCTION button 36 causes the controller 22 to change to a menu input mode from a standby mode, and vice versa. The ERASE button 38 usually clears the last digit entered.

The controller 22 controls the operations of the transmitter 18 and the receiver 16 over a plurality of control lines 40 and 42, respectively, responsive to control messages and user input. A microphone 44 receives speech signal input, converts the input into analog electrical signals and delivers the analog electrical signals to the transmitter 18. The transmitter 18 converts the analog electrical signals into digital data, encodes the data with error detection and correction information and multiplexes this data with control messages from the controller 22. The transmitter 18 modulates this combined data stream and broadcasts the resultant radio signals to the wireless network through the duplex filter 14 and the antenna 13.

A switch detector 46 is connected to a grasp-sensitive switch, as will be explained further, below. The switch detector 46 provides a signal to the controller 22 when one of the grasp switches detects a user grasping or squeezing the housing of the wireless unit 10. In accordance with another aspect of this invention, the switch detector 46 may also provide a signal to the controller 22 when one of the grasp switches detects a user letting go of, or putting down the wireless telephone 10.

Advantageously, the switch detector 46 delivers its signal to an OR gate 48. The signal from the switch detector 46 is OR'ed with any signals on a line 50 to the speaker 20 and with any signals on a line 52 from the microphone 44. In this manner, a signal line 54 provides a signal to the controller 22 when the user is speaking or listening but not holding the housing.

Figure 2:
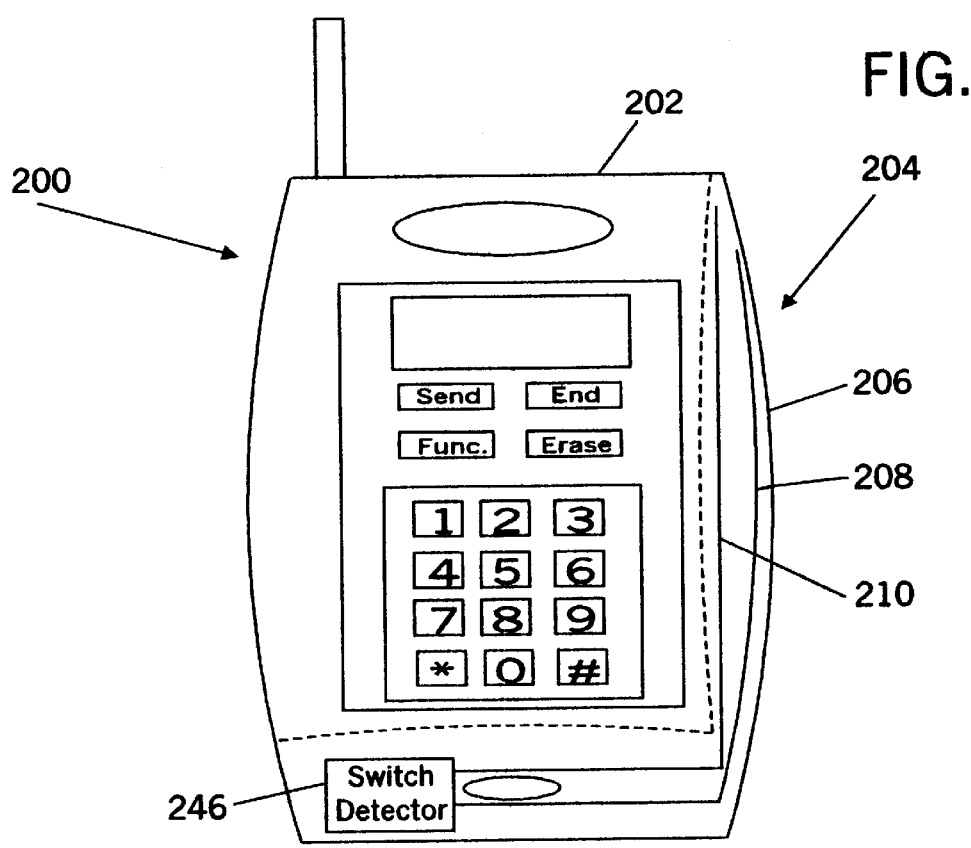
FIG. 2 is an elevational view with parts broken away of a wireless telephone illustrating a pressure sensitive switch in accordance with one embodiment of this invention.

Turning now to FIG. 2, a semi-cutaway front view of a wireless telephone 200 according to one aspect of this invention is shown. The wireless telephone 200 is configured with a flexible side 204 on one side of its housing 202. The flexible side 204 consists of an outer membrane 206, a first plate 208 and a second plate 210. When the user grasps and/or squeezes the housing 202, the first plate 208 is moved into contact with the second plate 210. This contact completes a circuit, which is detected by the switch detector 46. In response, the switch detector 246 sends a signal to the controller 22. The signal may be transitory or may be for the duration of the user's grasp. If the signal is transitory, then when the user lets go of the housing 202, and hence flexible side 204, another signal can be generated. If the signal is not transitory, then the controller 22 may be configured to change the operational state to the next sequential operational state. Of course, other forms of pressure sensitive switches are known in the art that can perform the same function. Then signals which broadly may be considered indicative of the fact that a user has picked up or set down the wireless telephone, are employed for control sequencing purposes as well be discussed further, below.

Figure 3:
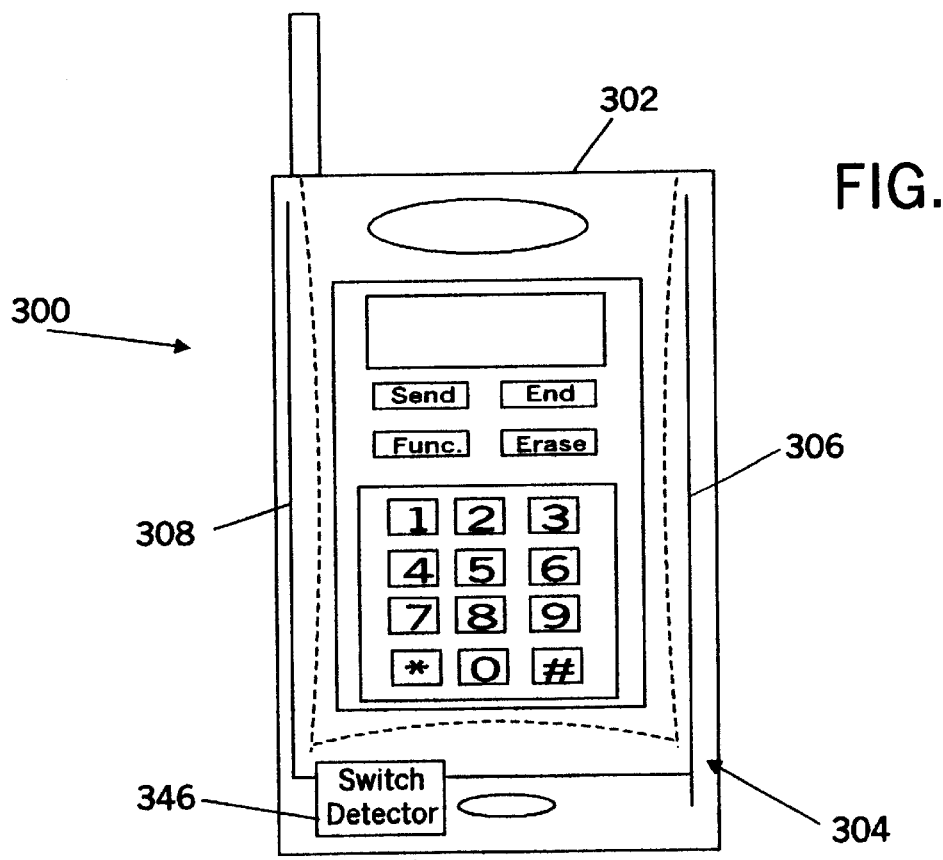
FIG. 3 is an elevational view with parts broken away of a wireless telephone illustrating a capacitance sensitive switch in accordance with another exemplary embodiment of this invention.

Turning now to FIG. 3, a semi-cutaway front view of a wireless telephone 300 according to another aspect of this invention is shown. The wireless telephone 300 is configured with a capacitance switch 304 on or embedded in the sides of the housing 302. The capacitance switch 300 consists of a first plate 306 and a second plate 308. In this exemplary embodiment, when the user grasps the housing 302, the conductive nature of the human hand causes a current to flow between the first plate 306 and the second plate 308. This completes a circuit, which is detected by the switch detector 346. In response, the switch detector 346 sends a signal to the controller 22. Again, the signal may be transitory or not, as mentioned above, to achieve the same functions.

Figure 4:
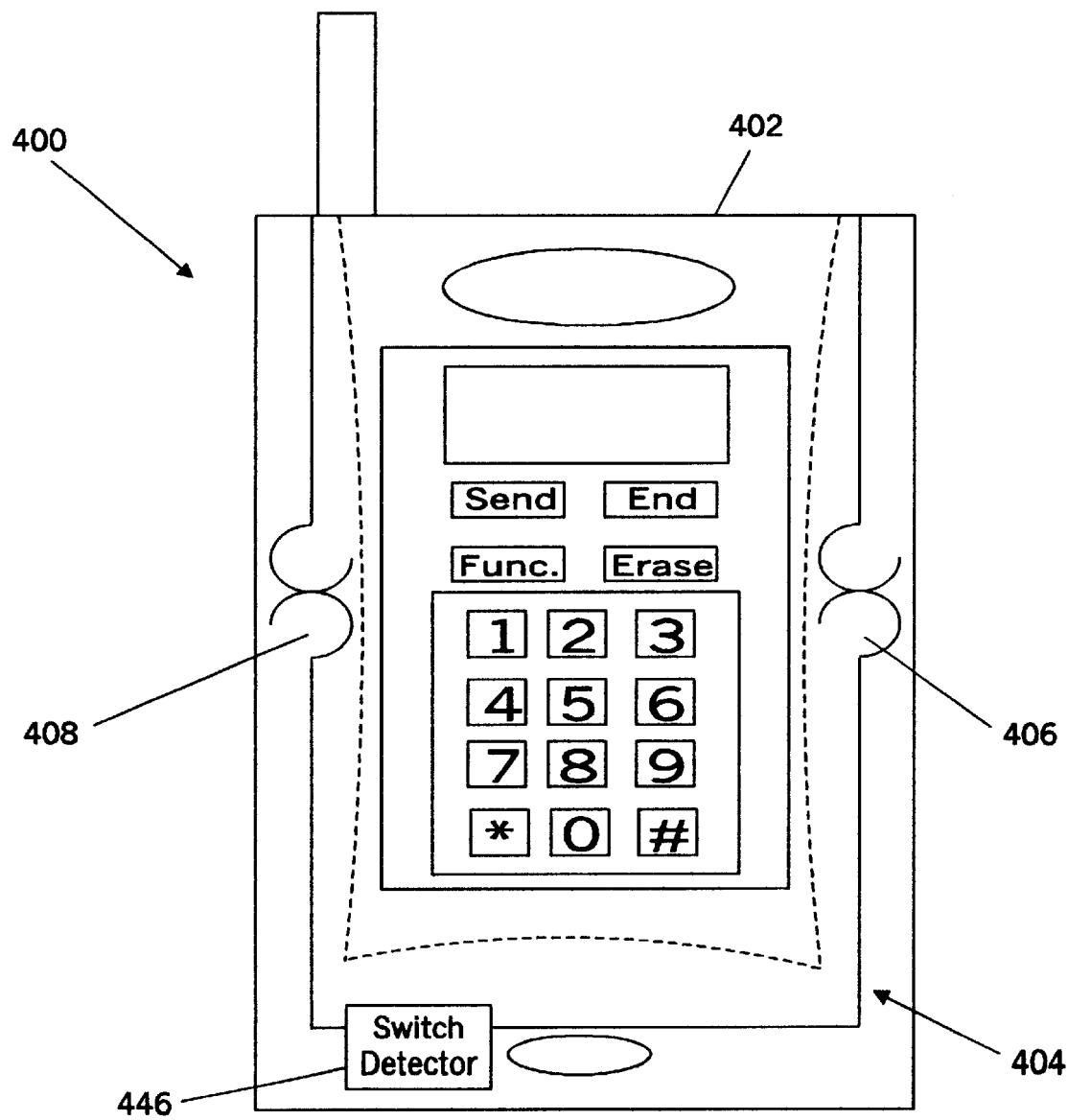
FIG. 4 is a further elevational view with parts broken away of a wireless telephone illustrating a thermal sensitive switch in accordance with a further exemplary embodiment of this invention.

FIG. 4 illustrates a grasp detection switch that uses a thermal sensor according to another aspect of this invention. The thermal sensor includes a first thermal switch 406 and a second thermal switch 408. When the user grasps the housing 402, the heat from the user's hand is detected by at least one of the thermal switches 406 and 408 completing a circuit, thus causing the switch detector 446 to send a signal to the controller 22. Again, the signal may be transitory or not, as mentioned above, to achieve the same functions.

Figure 5:
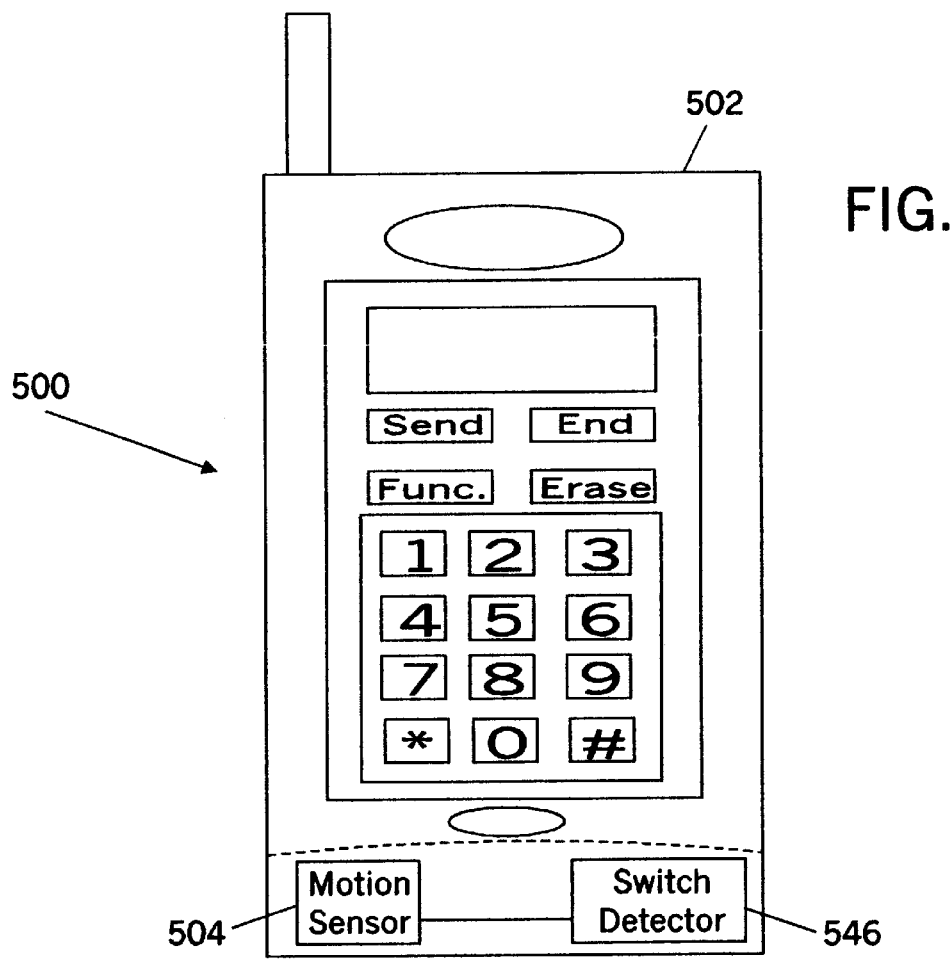
FIG. 5 is an elevational view with parts broken away of a wireless telephone illustrating a motion sensitive switch according to yet a further exemplary embodiment of this invention.

Turning now to FIG. 5, a semicutaway front view of a wireless telephone 500 according to still another aspect of this invention is shown. This wireless telephone 500 is configured with a motion sensitive switch 504 inside of the housing 502. The motion sensitive switch 504 sends a signal to the switch detector 546 when it senses that the housing is being moved. The signal is "debounced" (that is, changed from an unsteady state to a steady state) either at the switch detector 546 or at the controller 22. When the user picks up the wireless telephone of FIG. 5, the motion sensitive switch 504 sends a signal to the switch detector 546, which sends a signal to the controller 22. According to a further aspect of this invention, the detector 546 further includes a timer, and the switch detector 546 generates a signal when the housing is stationary for a predetermined time.

The wireless telephone may include an OR gate 48 (FIG. 1) receiving inputs from the microphone 20, the speaker 44 and the motion sensor 504. The switch detector 46 is connected to the OR gate such that the signal from the detector 546 is not delivered to the controller 22 when there is input from the microphone 20, the speaker 44 or the motion sensor 504 for the predetermined period of time, to prevent, for example, a premature change in state from active to standby if the wireless telephone 10 is put down for a short period of time.

Figure 6:
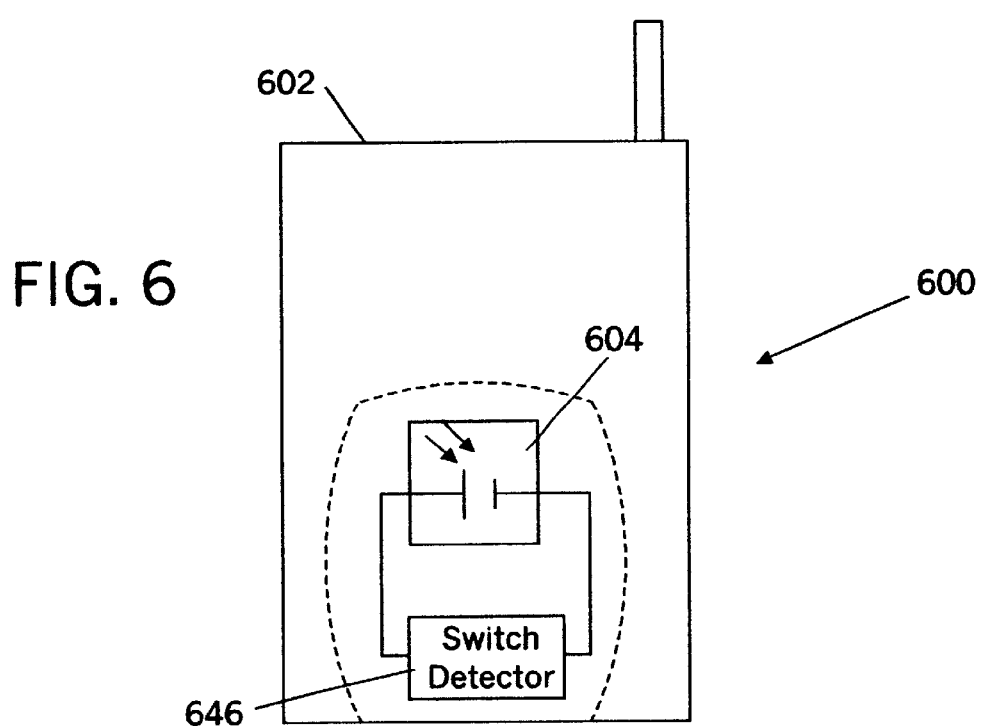
FIG. 6 is an elevational view with parts broken away of a wireless telephone illustrating a light sensitive switch in accordance with another exemplary embodiment of this invention.

Turning now to FIG. 6, a semi-cutaway rear view of a wireless telephone 600 according to another aspect of this invention is shown. The wireless telephone 600 is configured with a light sensitive switch 604, comprising a photocell in this exemplary embodiment, on one side of the housing 602 and positioned to be covered by the user's hand when the housing 602 is grasped. Thus, when the user grasps the housing 602, the ambient light is cut off from the photocell. This action breaks a circuit, which is detected by the switch detector 646. In response, the switch detector 646 sends a signal to the controller 22. When the user puts the wireless telephone 600 down, the photocell is uncovered and again completes a circuit, which is detected by the switch detector 646. Advantageously, the switch detector 646 may send a further signal to controller 22 responsive thereto.

Figure 7:
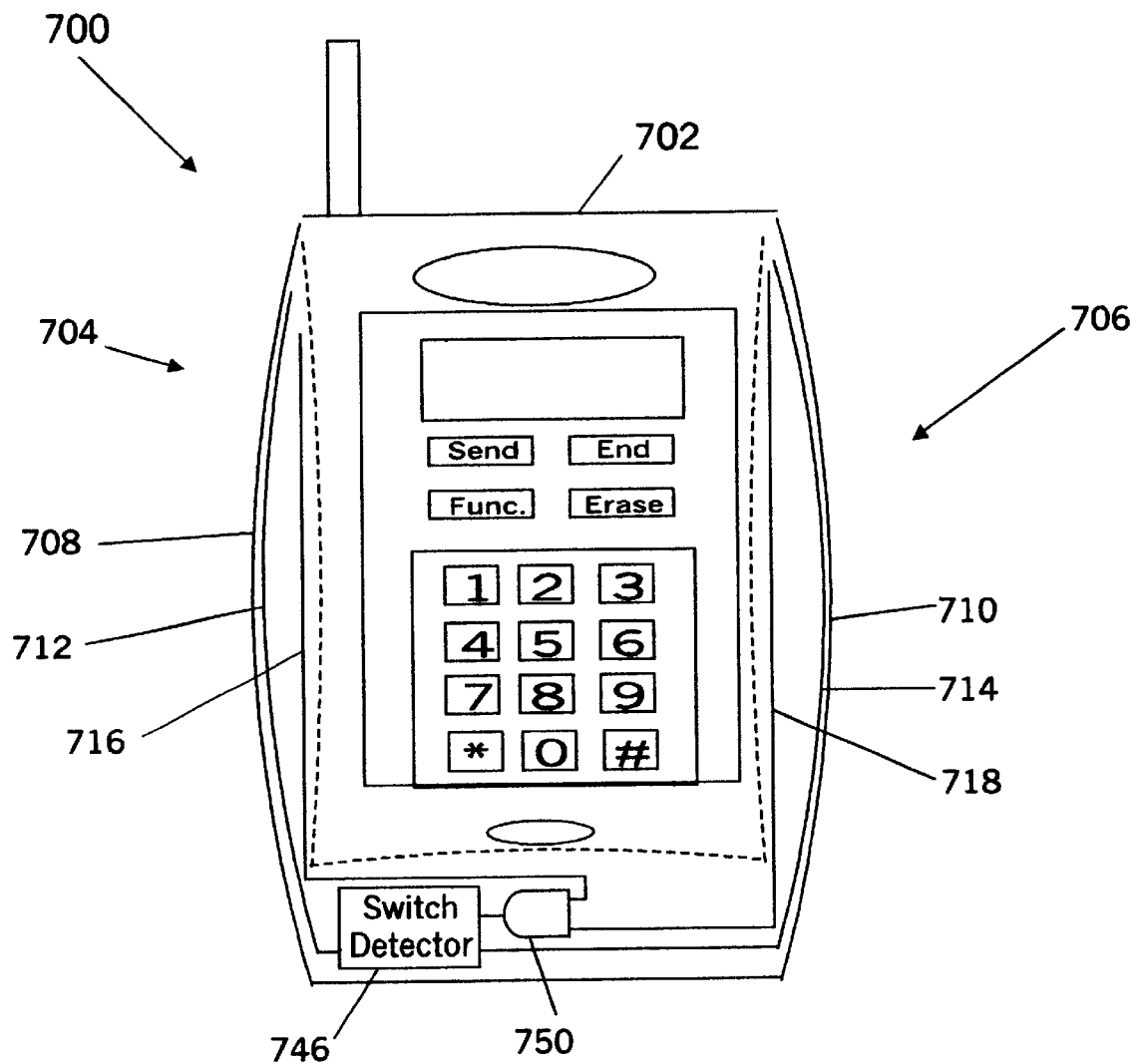
FIG. 7 is an elevational view with parts broken away of a wireless telephone illustrating two pressure sensitive switches, according to a further exemplary embodiment of this invention.

Turning now to FIG. 7, a semi-cutaway front view of a wireless telephone 700 according to one aspect of this invention is shown. The wireless telephone 700 is configured with two flexible sides 704, 706, on each side of the housing 702. The flexible sides 704, 706 each consists of an outer membrane 708, 710, a first plate 712, 714 and a second plate 716, 718. When the user grasps and/or squeezes the housing 702, either or both of the flexible sides 704 and 706 cause their respective first plate 712, 714 to contact the respective second plate 716, 718. This contact completes a circuit, which is detected by the switch detector 746. In response, the switch detector 746 sends a signal to the controller 22.

Alternatively, in accordance with another aspect of this invention, the switch detector 746 generates a first signal when the user squeezes the first flexible side 704 and second signal when the user squeezes the second flexible side 706.

According to a further aspect of this exemplary embodiment, in response to the first signal, the controller 22 is configured to select a second operational state following a first operational state in a predetermined sequence of a plurality of operational states. In response to the second signal, the controller 22 is configured to select another operational state in the sequence. Usually, but not always the "another" operational state will be a subsequent operational state following the second operational state in the sequence. An AND gate 750 receives the signal from both of the pressure sensitive switches 704, 706. The resulting output signal from the AND gate 750 is useful, for example, when the controller 22 is in the standby state. If both signals are detected at the AND gate 750, then the switch detector 46 generates a signal. This configuration ensures that certain changes in operational state occur when both switches are closed for purposes that will be discussed further, below.

Figure 8:
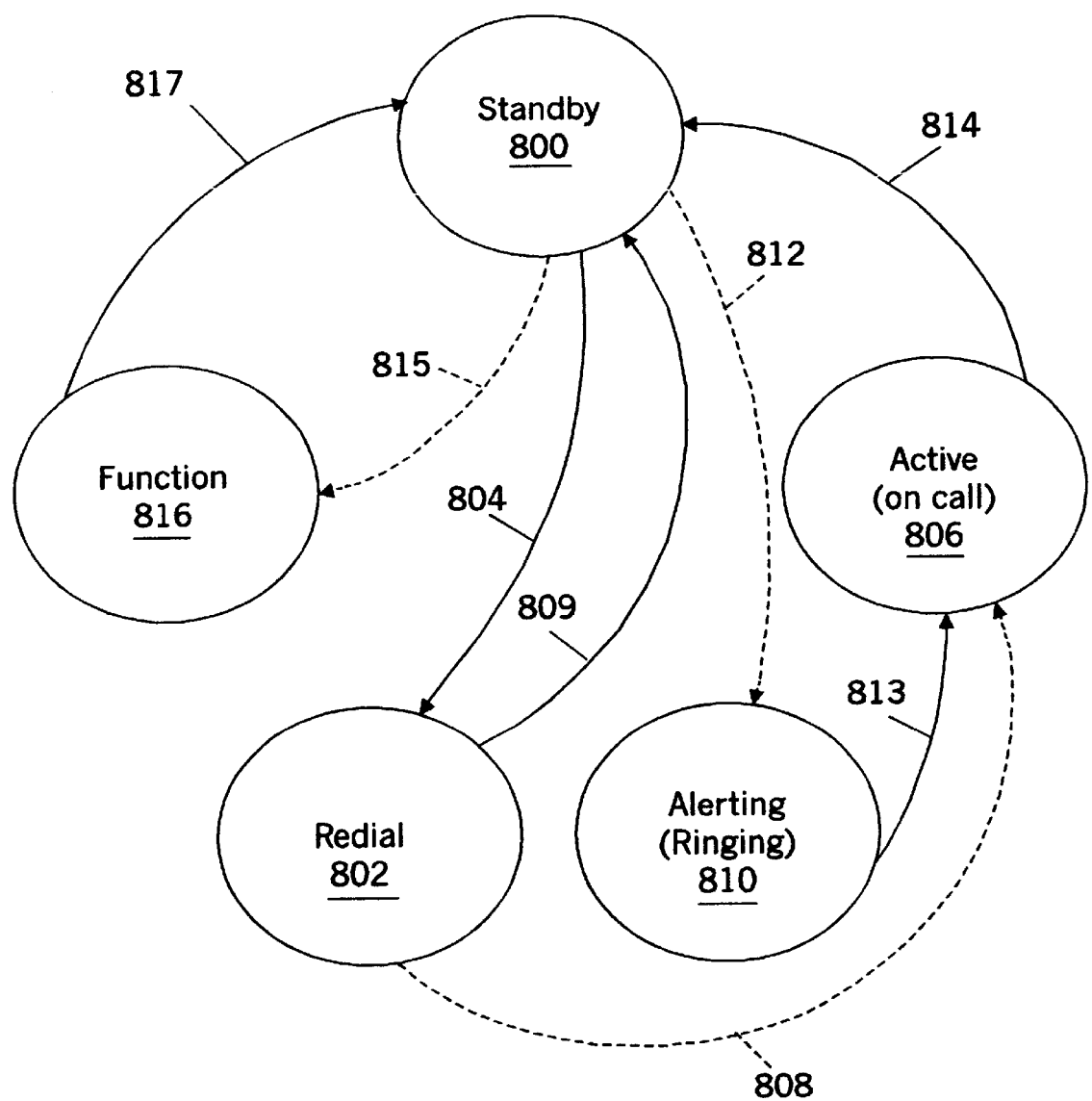
FIG. 8 is a state diagram of the operational states of a wireless telephone illustrating the state changes obtainable from an exemplary method of this invention.

Turning now to FIG. 8, a state diagram illustrating the sequential relationships among certain of the operational states of the controller 22, and hence the wireless telephone 10, are shown. When the wireless telephone 10 is first turned on and registers with a wireless network as is known in the art, the wireless telephone 10 is in a standby state 800. The next sequential state from the standby state 800 is the redial state 802, as shown by a line 804. Thus, when the wireless telephone 10 is in the standby state 800, the user can grasp the housing and change the state to the redial state 802. The next sequential state from the redial state 802 is the active state 806. This change of state is contingent upon the call being competed, so it is not operable by grasping the housing of the wireless telephone 10, as indicated by a dashed line 808. If the call is not completed, the user may change the state back to the standby 800 by squeezing the telephone, as shown by a line 809.

Another possible change of state from the standby state 800 is the alerting (ringing) state 810. This state is also not obtainable by grasping the housing, as indicated by a dashed line 812. From the alerting state 810, the user can change to the active state 806 by grasping the housing of the wireless telephone 10, as indicated by a line 813. In other words, the user can "answer the phone" by grasping and/or squeezing the housing with one hand. In the active state, the wireless telephone 10 is in full duplex radio communication with the wireless network.

The next sequential operational state after the active state is the standby state 800. This change of state is obtainable with the embodiments of FIGS. 2 and 7 by grasping and/or squeezing the housing of the wireless telephone 10, as illustrated by a line 814. In other words, the user can "hang up the phone" with one hand by squeezing it. With other embodiments, the user can move from the active state 806 to the standby state 800 by setting the wireless phone down for a predetermined period of time, or letting go of the housing.

A further state is the function state 816, which is attained when the user presses the FUNCTION key, as shown by a dashed line 815. In this state, the user can 15 program the wireless telephone 10, as is known in the art. Additionally, the user can answer "yes" or "no" by squeezing one side or the other of the wireless telephone in accordance with FIG. 6. From the function state 816, the next sequential state is the standby state 800, as shown by a line 817. The user can complete the programming function by grasping and/or squeezing the housing of the wireless telephone 10.

Figure 9:
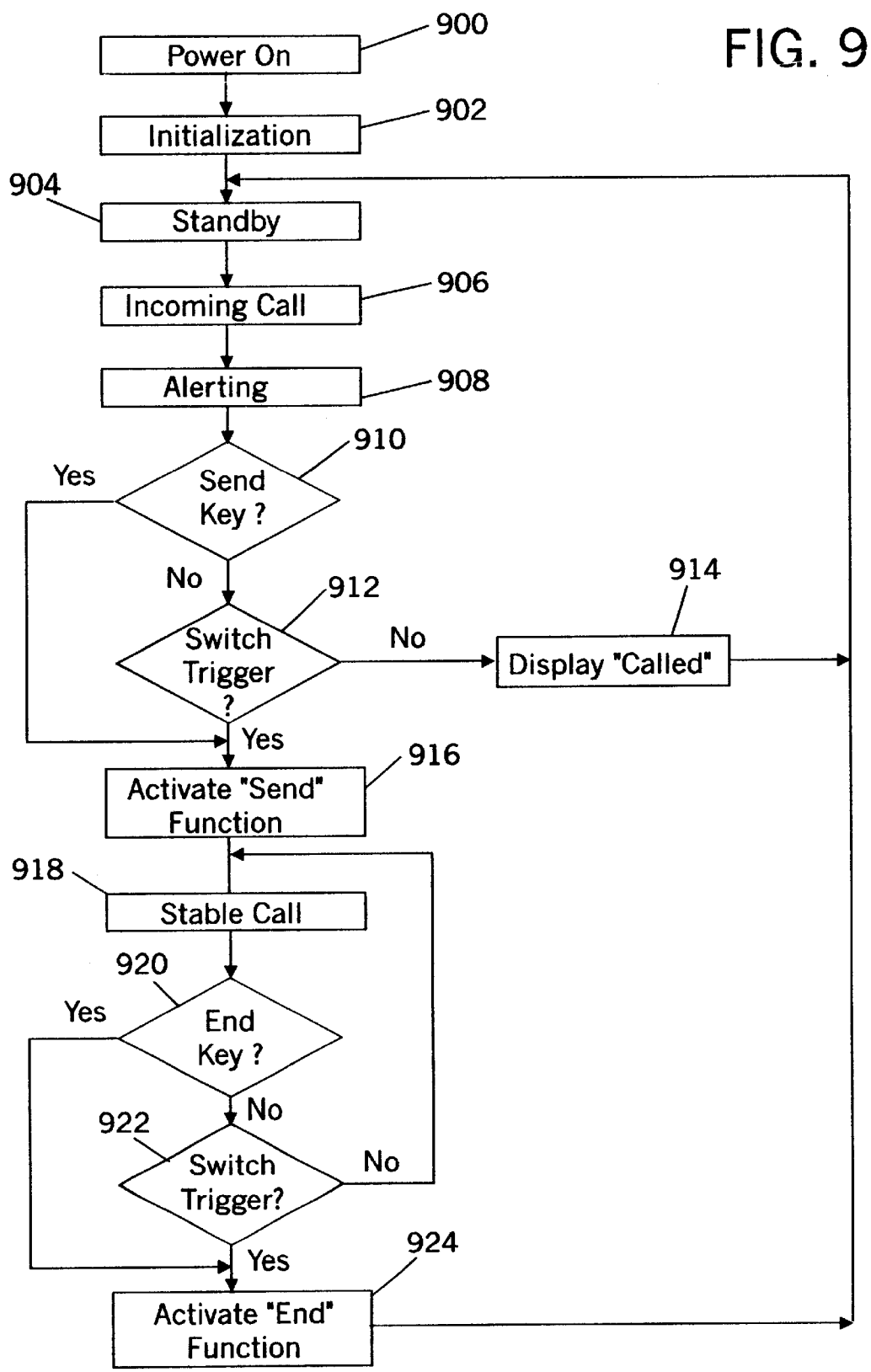
FIG. 9 is a flow chart illustrating the operation of an exemplary method according to this invention.

Turning now to FIG. 9, processing according to an exemplary method of this invention is shown. Processing starts in a box 900, where the wireless telephone 10 is powered on. Processing continues to a box 902, where the wireless telephone initializes, including registering with the wireless network, as is known in the art. In the box 904, the wireless telephone 10 is in the standby state 800 (FIG. 8), waiting for input. In a box 906, the wireless telephone 10 receives an alerting message from the wireless network, and then processing moves to the box 908, where the wireless telephone moves to the alerting state 810 (FIG. 8) responsive to the alerting message. In a decision diamond 910, a determination is made whether the user pressed the SEND key 32 (FIG. 1). The user may operate the wireless telephone 10 in either the manner of the prior art. If the user did not press the SEND key 32 in the decision diamond 910, then processing proceeds to a decision diamond 912. In the decision diamond 912, a determination is made whether the user has grasped, picked up and/or squeezed the housing of the wireless telephone, according to one of the aspects of this invention. If the user did not, then processing moves to a box 914, where the display is set to "Called" to indicate to the user that there was a call that was not picked up. Processing returns to the standby state in the box 904.

If the switch detector sent a signal indicating that the user squeezed the housing, or if the user pressed the SEND key 32 (FIG. 1), processing proceeds to a box 916, where a full duplex connection to the wireless network is established, and the wireless telephone 10 is in the active state 806 (FIG. 1). In the box 918, there is a stable connection in the active state 806.

Processing continues to a decision diamond 920, where a determination is made whether the user pressed the END key 34 (FIG. 1). If the user did not press the END key 34, then processing proceeds to a decision diamond 922, where a determination is made whether the user squeezed the housing again (or put the phone down for a predetermined period of time). If the user did not, then processing returns to the active state, in the box 918.

If, in the decision diamond 920 the user pressed the end button, or in the decision diamond 922 the user squeezed the housing, then processing proceeds to an action box 924, where the call is torn down, and processing returns to the standby state in the box 904.

It will therefore be apparent that the invention simplifies the operation of a wireless telephone. Not only can a user answer a call and hang up with just one hand, a number of functions can be carried out that normally require numerous buttons to be pressed. As a result, a wireless telephone according to this invention works in a similar manner to a wireline telephone, resulting in a more universal understanding of control of the wireless telephone.

It is to be understood that the above-described embodiment is to illustrate the principles of this invention, and that those skilled in the art may devise many variations without departing from the scope of the invention. It is, therefore, intended that such variations be included within the scope of the appended claims.

What is claimed is:

1. A control apparatus for a hand-held wireless telephone having a housing with a motion sensor and operating in a first operational state comprising one of a plurality of sequential operational states, said control apparatus changing said operational state of said wireless telephone from said first operational state to a second operational state, said control apparatus comprising:

a timer;

a detector that produces a signal responsive to moving of said housing by a user, said detector further generating said signal when said housing is stationary for a predetermined time after movement;

an OR gate receiving input from a microphone, a speaker, and the motion sensor, the detector being connected to said OR gate such that the detector does not send the signal when there is input from said microphone, speaker or said motion detector; and a controller responsive to receiving the signal produced by said detector and configured to select a next sequential operational state of said first operational state as the second operational state.

2. The control apparatus of claim 1 wherein said detector comprises a light-sensitive element that generates the signal responsive to the user's hand cutting off light to the element.

3. A control apparatus for a hand-held wireless telephone having a housing, a microphone and a speaker and operating in an active state and a second state, comprising:

a detector that produces a first signal responsive to a user holding the housing of the wireless telephone;

an OR gate receiving input from said detector and at least one of said microphone and speaker and outputting a second signal when any signal is input to said OR gate; and a controller maintaining the telephone in said active state responsive to receiving said second signal output by said OR gate and changing from said active state responsive to not receiving said second signal from said OR gate.

4. The control apparatus of claim 3, wherein said OR gate outputs no signal when no input is received and said controller responds to receiving no output from said OR gate by placing said telephone in said second state.

5. The control apparatus of claim 4, wherein said second state is a standby state.

6. The control apparatus of claim 3, wherein said OR gate receives input from both said microphone and said speaker.

7. The control apparatus of claim 3, wherein said detector comprises a motion sensor, and said detector produces said first signal responsive to motion of the housing.

8. The control apparatus of claim 7, wherein said detector further comprises a timer, and said detector produces said first signal for a selected period of time measured by said timer after said motion sensor ceases to sense motion of said telephone.

9. The control apparatus of claim 3, wherein said detector comprises a grasp-sensitive switch.

10. The control apparatus of claim 9 wherein said detector comprises a thermal sensor embedded in said housing that generates the signal responsive to a rise in temperature around said housing.

11. The control apparatus of claim 9 wherein said housing has at least one flexible side, and wherein said detector comprises a pressure sensitive switch under said flexible side that generates said signal when the user squeezes said flexible side and said flexible side contacts said switch.

12. The control apparatus of claim 9 wherein said housing has first and second spaced locations, and wherein said detector comprises a first pressure sensitive switch under the first spaced location and a second pressure sensitive switch under the second spaced location, said detector generating said signal when the user squeezes either of said first and said second spaced locations and either of said spaced locations switches one of said first and said second switches.

13. The control apparatus of claim 9 wherein said telephone has sequential operational states and and said housing has first and second spaced locations;

said detector comprises a first pressure sensitive switch under the first spaced location and a second pressure sensitive switch under the second flexible spaced location, said detector generating a first signal when the user squeezes the first said spaced location and the first spaced location switches the first switch, and generates a second signal when the user squeezes the second spaced location and the second spaced location switches the second switch; and the controller is configured to select a next sequential operational state responsive to receiving the first signal, and selects a further sequential operational state responsive to receiving the second signal.

14. The control apparatus of claim 13 wherein, when said wireless telephone is operating in a function state, said controller is configured to change said function state to a standby state responsive to said grasp-sensitive switch.

15. The control apparatus of claim 14 wherein, when said wireless telephone is operating in a function state, said controller is configured to change to a positive state responsive to the first signal and a negative state responsive to the second signal.

16. The control apparatus of claim 9 wherein said detector comprises a capacitance sensor enclosed in said housing that generates the signal responsive to the user's grasp completing a circuit through said capacitance sensor.

17. The control apparatus of claim 9 wherein, when said wireless telephone is operating in an alerting state, said controller is configured to change said alerting state to a send state responsive to said grasp-sensitive switch.

18. The control apparatus of claim 9 wherein, when said wireless telephone is operating in a send state, said controller is configured to change said send state to a standby state responsive to said grasp-sensitive switch.

19. The control apparatus of claim 9 wherein, when said wireless telephone is operating in a standby state, said controller is configured to change said standby state to a redialing state responsive to said grasp-sensitive switch.

20. The control apparatus of claim 9 wherein, when said wireless telephone is operating in an alerting state, said controller is configured to change said operational state to a send state responsive to said grasp-sensitive switch.

* * * * *